(12) United States Patent
Stipe (10) Patent No.: US 8,164,988 B2
(45) Date of Patent: Apr. 24, 2012

(54) ALL-OPTICAL MAGNETIC RECORDING SYSTEM USING CIRCULARLY POLARIZED LIGHT AND BIT-PATTERNED MEDIA

(75) Inventor: Barry Cushing Stipe, San Jose, CA (US)

(73) Assignee: Hitachi Globa Storage Technologies Netherlands B.V., Amsterdam (NL)

( * ) Notice: Subject to any disclaimer, the term of this patent is extended or adjusted under 35 U.S.C. 154(b) by 292 days.

(21) Appl. No.: 12/707,402

(22) Filed: Feb. 17, 2010

(65) Prior Publication Data

US 2011/0199867 A1    Aug. 18, 2011

(51) Int. Cl.
G11B 11/00    (2006.01)

(52) U.S. Cl. .................. 369/13.33; 360/59

(58) Field of Classification Search ............... 369/13.33, 369/13.32, 13.24, 13.14, 13.03, 13.12, 13.13, 369/13.01, 13.02, 112.27; 360/59, 313, 245.3, 360/135, 126, 123.17, 128
See application file for complete search history.

(56) References Cited

U.S. PATENT DOCUMENTS

| 5,497,359 | A | 3/1996 | Mamin et al. |
| 6,055,220 | A | 4/2000 | Mamin et al. |
| 6,754,017 | B2 * | 6/2004 | Rettner et al. ............... 360/51 |
| 7,133,229 | B2 * | 11/2006 | Semba ....................... 360/51 |
| 7,324,294 | B2 * | 1/2008 | Moser ....................... 360/51 |
| 7,986,493 | B2 * | 7/2011 | Weller et al. ............... 360/135 |
| 8,031,561 | B2 * | 10/2011 | Hellwig et al. ............. 369/13.01 |
| 2003/0123335 | A1 | 7/2003 | Rettner et al. |

FOREIGN PATENT DOCUMENTS

DE    105344 A    4/1974

OTHER PUBLICATIONS

Stanciu et al. "All-Optical Magnetic Recording with Circularly Polarized Light", PRL 99, 047601 (2007).

Wang et al.,"Towards 10 Terabit/in2 All Optical Magnetic Recording" by the Data Storage Institute, Aug. 2009.
Zhang et al. "High-density all-optical magnetic recording using a high-NA lens illuminated by circularly polarized pulse lights", Physics Letters A 372 (2008) 6294-6297.
Zhang et al., "Theoretical study on all-optical magnetic recording using a solid immersion lens", J . Opt Soc. Am. B, vol. 26, No. 1, Jan. 2009, p. 176. Kimel et al., "Femtosecond opto-magnetism: ultrafast laser manipulation of magnetic materials", Laser & Photon. Rev. 1, No. 3. 275-287 (2007).
Kruglyak et al., "Generation of Femtosecond Electromagnetic Pulses at the Nanoscale", Proc. of SPIE vol. 6328, 63280K, (2006).
Kruglyak et al., "Use of the Faraday optical transformer for ultrafast magnetization reversal of nanomagnets", Journal of Nanophotonics, vol. 1, 013502 (Jan. 19, 2007).

\* cited by examiner

*Primary Examiner* — Ali Neyzari
(74) *Attorney, Agent, or Firm* — Thomas R. Berthold (57) ABSTRACT

A perpendicular magnetic recording system uses bit-patterned media (BPM) and circularly polarized light to switch the magnetization of the discrete magnetic bits by the inverse Faraday effect. Circularly polarized light generates an external rotating electric field in a plane orthogonal to the light propagation direction, which induces a magnetic field parallel to the light propagation direction in a magnetic material exposed to the electric field. The BPM is a generally planar substrate with discrete spaced-apart metal or metal alloy magnetic islands that are magnetizable in a perpendicular direction and are separated by nonmagnetic spaces of nonmetallic material on the substrate. A near-field metal transducer is patterned into at least three tips, with the tips surrounding and defining a transducer active region. The circularly polarized light is incident on the tips, which produce a strong in-plane rotating electric field. A magnetic island exposed to the rotating electric field will experience an induced perpendicular magnetic field that switches the magnetization of the magnetic island.

17 Claims, 7 Drawing Sheets

ALL-OPTICAL MAGNETIC RECORDING SYSTEM USING CIRCULARLY POLARIZED LIGHT AND BIT-PATTERNED MEDIA

BACKGROUND OF THE INVENTION

1. Field of the Invention

This invention relates generally to magnetic recording systems, like magnetic recording disk drives, and more particularly to an all-optical magnetic recording system that does not require an external magnetic field to switch the magnetization of the data bits.

2. Description of the Related Art

The more recent commercially available magnetic recording hard disk drives use perpendicular recording disks, wherein the magnetized regions are oriented perpendicular to the plane of the recording layer of the disk. The conventional perpendicular magnetic recording disk is a "continuous-media" (CM) disk wherein the recording layer is a continuous layer of magnetic material with perpendicular magnetic anisotropy that becomes formed into concentric data tracks containing the magnetically recorded data bits when the write head writes on the magnetic material. The read/write head is located on an air-bearing slider that is supported above the smooth disk surface on a thin film of air or "air-bearing" as the disk rotates.

Perpendicular magnetic recording disks with "bit-patterned media" (BPM) have been proposed to increase the data density. In BPM disks, the magnetic material on the disk is patterned into small isolated data islands such that there is a single magnetic domain in each island or "bit". The single magnetic domains can be a single grain or consist of a few strongly coupled grains that switch magnetic states in concert as a single magnetic volume. This is in contrast to conventional CM disks wherein a single "bit" may have multiple magnetic grains separated by segregant material. To produce the required magnetic isolation of the patterned islands, the magnetic moment of the spaces between the islands must be destroyed or substantially reduced so as to render these spaces essentially nonmagnetic. In one type of BPM disk, the data islands are elevated, spaced-apart pillars that are separated by nonmagnetic trenches or recesses.

For both CM and BPM disks, the magnetized regions or the individual data islands have their magnetizations switched by an external magnetic field from the disk drive's write head. Because it is known that the recorded magnetizations can experience thermal instability, magnetic recording material with high magneto-crystalline anisotropy may be required. However, this type of material has a high coercivity which requires a high external write field, typically beyond the field that can be achieved by current disk drive write heads. Since it is known that the coercivity of the magnetic material is temperature dependent, one proposed solution to the thermal stability problem is thermally-assisted recording (TAR), sometimes also called heat-assisted magnetic recording (HAMR), wherein the high magneto-crystalline anisotropy material is heated locally to near or above its Curie temperature to lower the coercivity enough so that the external magnetic field from the write head can switch the magnetization. Several TAR approaches have been proposed, such as incorporating on the slider near the write head either an electrically resistive heater or an optical channel with an aperture that emits laser radiation to heat the magnetic recording material while it is exposed to the write field. However, these TAR systems are complex and require complicated fabrication processes to incorporate all the required elements into the slider.

What is needed is a magnetic recording system that does not require a write head to provide an external magnetic field to switch the magnetization of the recorded bits.

SUMMARY OF THE INVENTION

The invention relates to a perpendicular magnetic recording system that uses bit-patterned media (BPM) and circularly polarized light to switch the magnetization of the discrete magnetic bits by the inverse Faraday effect (IFE). In the IFE, circularly polarized light generates an external rotating electric field in a plane orthogonal to the light propagation direction, which induces a magnetic field parallel to the light propagation direction in a magnetic material exposed to the electric field. The BPM is a generally planar substrate with discrete spaced-apart metal or metal alloy magnetic islands that have an in-plane (parallel to the substrate) characteristic dimension d1. The magnetic islands are magnetizable in a perpendicular direction, i.e., perpendicular to the substrate, and are separated by nonmagnetic spaces of non-metallic material on the substrate. A polarizer circularly polarizes the light from a laser and directs it to a near-field transducer. The near-field transducer is formed of metal, like a metal film, with an active region having an in-plane characteristic dimension d2. The transducer is maintained with its active region within a near-field distance d3 from the islands, i.e., a distance less than the wavelength of the light. The transducer may be an aperture-type transducer or an antenna-type transducer wherein the metal is patterned into at least three, but preferably four, tips, with the tips defining the transducer active region. The circularly polarized light is incident on the tips, which produce a strong in-plane rotating electric field. A magnetic island, which is metal and located within the near-field, also has an effect on the near-field pattern from the tips. The magnetic island is exposed to the rotating electric field experiences an induced perpendicular magnetic field that switches the magnetization of the magnetic island. Light circularly polarized in one of two opposite directions, i.e., right-handed or left-handed polarization, induces a magnetic field in one of two opposite perpendicular directions so that the magnetization of the islands can be switched to one of two opposite perpendicular directions. The characteristic dimension d1 of the islands is preferably less than the lateral in-plane dimension d2 of the active region, but may be less than or equal to 1.5 times d2.

For a fuller understanding of the nature and advantages of the present invention, reference should be made to the following detailed description taken together with the accompanying figures.

DETAILED DESCRIPTION OF THE INVENTION

In this invention the inverse Faraday effect (IFE) is used together with a special near-field transducer and BPM to provide an "all optical" magnetic recording system, i.e., one that does not require a magnetic field to reverse the magnetization of the individual bits or islands of the BPM. The Faraday effect is a magneto-optic phenomenon in which the longitudinal polarization direction of light traveling through a material is rotated in a magnetic field aligned parallel to the light propagation direction. In the IFE, circularly polarized light induces a magnetic field in a material parallel to the light propagation direction. A static magnetization $\vec{M}(0)$ is induced in the material by an external rotating electric field with the frequency ω, which can be achieved with a high-intensity circularly polarized laser pulse. The induced magnetization is proportional to the vector product of $\vec{E}$ and $\vec{E}^*$, the electric field of the light wave and its complex conjugate, respectively:

$$\vec{M}(0) \propto [\vec{E}(\omega) \times \vec{E}^*(\omega)]$$  Equation (1)

The sign of this induced magnetization depends on the helicity of the circularly polarized light, i.e., right-handed or left-handed. Previous demonstrations and simulations of magnetic switching by IFE have been limited to far-field focused spots and/or to a continuous layer of magnetic material, i.e., CM, or to simulations of electric field intensity of transducers alone without a magnetic material for switching. For example, Stanciu et al. "All-Optical Magnetic Recording with Circularly Polarized Light", PRL 99, 04760 (2007), described a system where a beam of circularly polarized light was focused to a 100 μm spot on a continuous film of GdFeCo to change the magnetization of magnetic domains in the continuous film. Similarly, Wang et al., in a presentation titled "Towards 10 Terabit/in$^2$ All Optical Magnetic Recording" by the Data Storage Institute in August, 2009, proposed a near-field transducer for circularly polarized light and simulated the electric field intensity in air at a specified distance from the transducer without the presence of magnetic material.

Figure 1A:
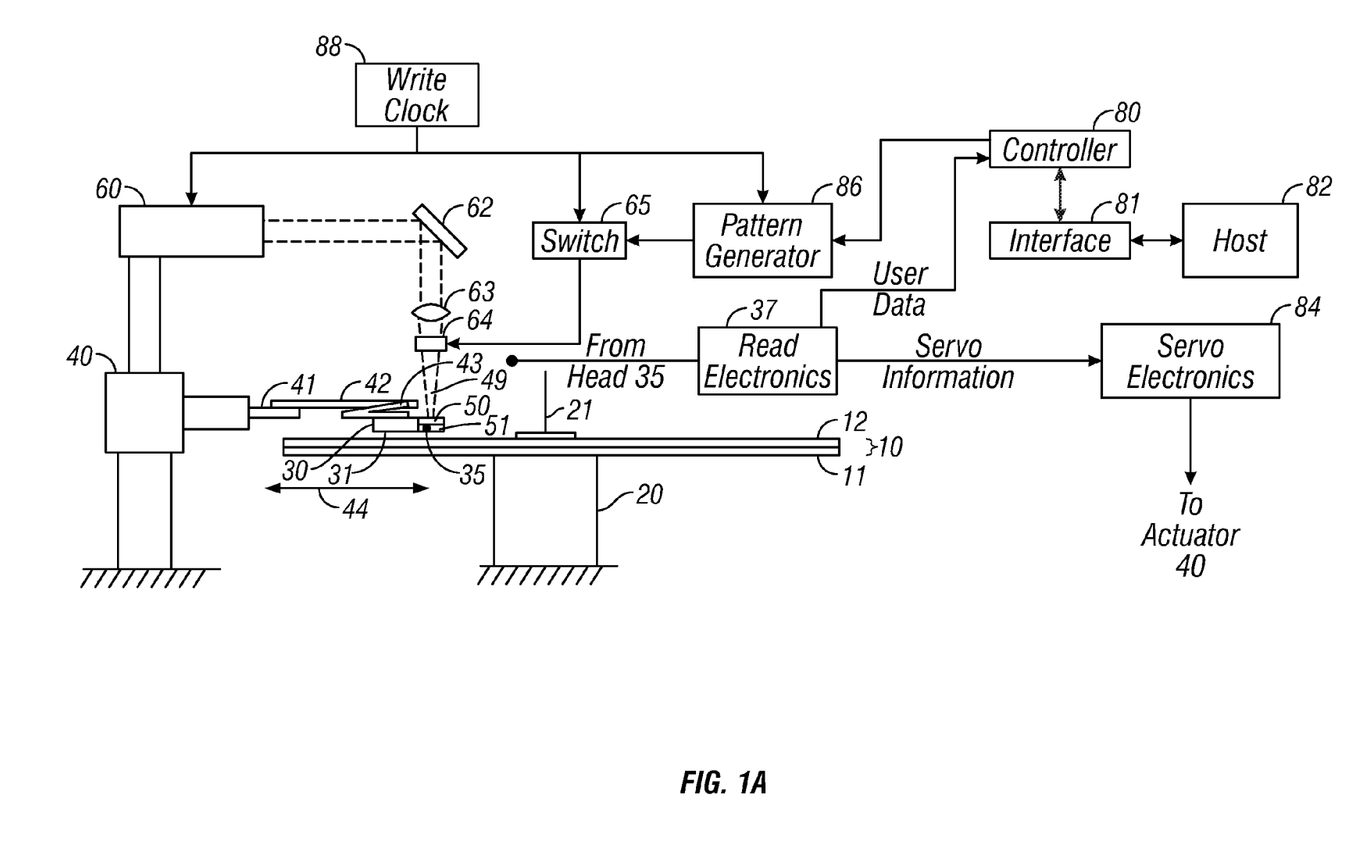
FIG. 1A is a schematic diagram of an all-optical magnetic recording system according to the invention.

FIG. 1 is a schematic diagram of an all-optical magnetic recording system according to the invention. The magnetic recording medium 10 is a substrate 11 with a generally planar surface and a BPM magnetic recording layer 12 on the substrate 11. In a magnetic recording disk drive embodiment, like that depicted in FIG. 1, the medium 10 is a rotatable disk 10 that is supported on a spindle motor 20 that rotates about axis 21. Thus the discrete magnetic bits or islands of recording layer 12 are arranged in concentric circular data tracks.

The spindle motor 20 may be a commercially available disk drive spindle motor with very low non-repeatable runout. A carrier 30 has an air-bearing surface (ABS) 31 that faces the disk 10 and supports the carrier 30 in very close proximity, e.g., about 2 to 20 nm above the disk 10. The carrier 30 supports an optical channel 50 and near-field transducer 51 that outputs circularly polarized laser light to the bits or islands of the recording layer 12 to magnetize the islands. The carrier 30 also supports a read head 35, such as a conventional magnetoresistive read head, that detects or reads the magnetized data islands and provides a readback signal. The carrier 30 is connected to a carrier actuator 40 that includes a rigid arm 41 and a suspension that includes load beam 42 and flexure 43. The suspension may be a conventional suspension like that used in magnetic recording disk drives, wherein the flexure 43 allows the carrier 30 to "pitch" and "roll" while it is supported above the rotating disk by the ABS 31.

The carrier 30 is movable by actuator 40 in a radial direction perpendicular to axis 21, as shown by arrow 44. The actuator 40 may be either a linear actuator that moves the carrier 30 along a purely radial line or a rotary actuator, such as a rotary voice-coil-motor (VCM) actuator, that rotates the carrier 30 along a generally radial or arcuate path. The actuator 40 positions the carrier 30 to the desired individual data track so that the transducer 51 and read head 35 may access the individual islands in the data tracks.

The optical system of the magnetic recording system of FIG. 1A includes laser 60, mirror 62, focusing lens 63, and circular polarizer 64. The laser 60 generates linearly polarized light and may be collimated, particularly if laser 60 is a diode laser. The circularly polarized light beam 49 is directed to optical channel 50 and transducer 51. The laser 60, mirror 62, focusing lens 63 and circular polarizer 64 may be attached to the actuator 40 so that the laser light is always directed to the transducer 51 as the carrier 30 moves generally radially. The focusing lens 63 may also be located on or incorporated into the carrier 30. Alternatively, the light from laser 60 may be delivered to the transducer 51 by an optical fiber. The circular polarizer 64 may be a conventional optical device like a quarter wave plate cemented to the back of a linear polarizer with a specific orientation such that the light emerging from the quarter wave plate is circularly polarized.

In FIG. 1A, the item labeled "switch 65" is meant to represent any device or system that can supply laser pulses to the optical channel 50 with circular polarization in one of two opposite directions, i.e., right-handed or left-handed polarization so that the direction of perpendicular magnetization of the data island exposed to the output of transducer 51 can be switched to one of two opposite perpendicular directions.

The wavelength of light from laser 60 may be selected from a range of wavelengths. Laser 60 is preferably a diode laser, like those similar to CD-RW type laser diodes, with a wavelength in the range of approximately 780 nm to 980 nm. Other types of lasers may be used, such as DVD-RW type laser diodes, with a wavelength of approximately 650 nm, and Blu-ray type laser diodes, with a wavelength of approximately 400 nm. Short pulses, as short as 1 ns, are generated, if needed, by applying a short electrical pulse to the diode contacts.

FIG. 1A also shows schematically the transfer of user data between a host system, such as a PC, and the disk drive. The disk 10 contains not only recorded user data but pre-recorded non-data servo information that is used by the actuator 40 to maintain the carrier 30 on the desired track and to move the carrier 30 to different tracks. The signals from both user data and servo information are detected by the read head 35 and amplified and decoded by read electronics 37. User data is sent to controller electronics 80 and through interface electronics 81 to the host 82, and servo information is sent to servo electronics 84 which is coupled to the actuator 40. The data to be written to the disk is sent from the host 82 to interface electronics 81 and controller electronics 80 and then as a data queue to pattern generator 86 and then to switch 65. The switch 65 controls the direction of circular polarization to the transducer 51 to magnetize the individual islands in the desired perpendicular direction according to the pattern of the data queue. The pattern generator 86, switch 65 and laser 60 are controlled by a write clock 88. The write clock 88 is synchronized with the location of the data islands so that the laser pulses are correctly timed to enable the transducer 51 to magnetize the desired data islands and only the desired data islands. Various techniques are known for synchronizing the write clock with the location of the data islands in disk drives with BPM. These include, but are not limited to, the use of a separate read head for detecting the data islands, as described in U.S. Pat. No. 6,754,017 B2; the use of the nonmagnetic spaces between the data islands, as described in U.S. Pat. No. 7,324,294 B2; and the use of servo information timing marks, as described in U.S. Pat. No. 7,133,229 B2 and US 2008/0304173 A1.

Figure 1B:
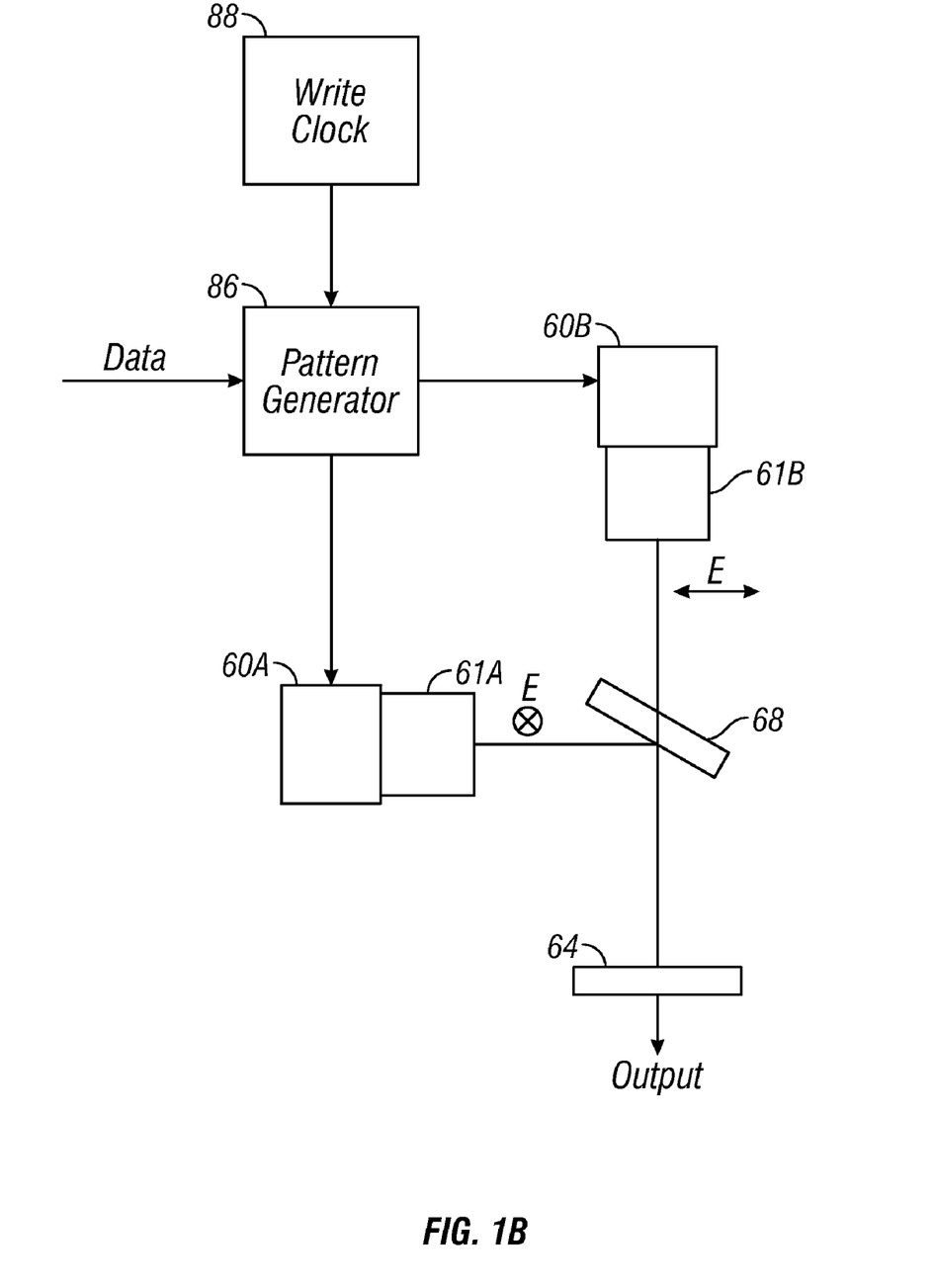
FIG. 1B is a schematic diagram of a system for switching the direction of circular polarization of the light to the near-field transducer in the all-optical magnetic recording system according to the invention.

FIG. 1B is a schematic diagram of a system that serves as switch 65 (FIG. 1A) for switching the direction of circular polarization of the light to the near-field transducer in the all-optical magnetic recording system according to the invention. In this system there are two lasers 60A, 60B, with respective collimators 61A, 61B, that generate two beams linearly polarized in orthogonal directions, as shown by E field in the plane of the paper for the beam from collimator 61B and E field orthogonal to the plane of the paper for the beam from collimator 61A. The two beams are directed to a beam splitter 68 and then to circular polarizer 64, which may be a conventional optical device like a quarter wave plate. The output from circular polarizer 64 is directed to the optical channel 50 (FIG. 1A). The lasers 60A, 60B generate pulses in response to pattern generator 86, which is controlled by write clock 88. The pattern generator 86 triggers pulses from lasers 60A, 60B, which are linearly polarized in orthogonal directions, so that the output from circular polarizer 64 can be either right-handed or left-handed, depending on which laser was pulsed. This enables the data islands to be magnetized in one of two opposite perpendicular directions.

Figure 2:
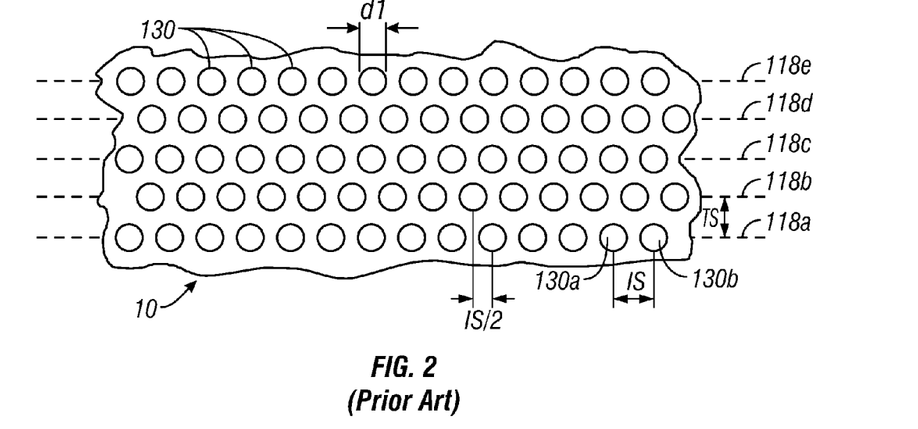
FIG. 2 is a top view of an enlarged portion of a prior art bit-patterned media (BPM) magnetic recording disk showing the recording layer patterned into discrete magnetic data islands arranged in tracks.

FIG. 2 is a top view of an enlarged portion of prior art disk 10 showing the recording layer patterned into discrete magnetic islands 130 arranged in tracks 118a-118e. Because FIG. 2 depicts only a very small portion of the disk, the tracks 118a-118e appear as parallel lines. However the tracks 118a-118e are actually small sections of concentric circular tracks. The islands 130 contain magnetizable recording material and are arranged in the circular tracks 118a-118e spaced-apart in the radial or cross-track direction. The tracks are typically equally spaced apart by a fixed track spacing TS. The spacing between data islands in a track is shown by distance IS between data islands 130a and 130b in track 118a, with adjacent tracks being shifted from one another by a distance IS/2, as shown by tracks 118a and 118b. While the islands 130 are shown as being circularly shaped, they may have other shapes, such as generally rectangularly or generally elliptical. The islands have an in-plane (parallel to the disk substrate) characteristic dimension (d1). The characteristic dimension of an island is its largest dimension, for example the longest side of a rectangularly-shaped island, the diameter of a circularly-shaped island and the long axis of an elliptically-shaped island.

In this invention the BPM disk 10 is a perpendicular magnetic recording disk, wherein the magnetization directions of the individual islands 130 are perpendicular to or out-of-the-plane of the recording layer in the islands. To produce the required magnetic isolation of the patterned data islands 130, the magnetic moment of the regions or spaces between the islands 130 must be destroyed or substantially reduced to render these spaces essentially nonmagnetic. In this invention the islands 130 of magnetic material are a metal or metal alloy and the nonmagnetic spaces between the islands 130 are a non-metallic material, such as $SiO_2$, $Al_2O_3$ or diamond-like carbon (DLC). Thus the BPM in this invention would appear like that in FIG. 2 with the magnetic islands 130 being a metal or metal alloy and the regions surrounding the islands 130 being a non-metallic material.

BPM disks may be fabricated by any of several known techniques. In one technique a continuous magnetic film is deposited onto a substrate and the film is then ion-beam etched to form the separate data islands. In another type of BPM, the data islands are elevated, spaced-apart pillars that extend above the disk substrate surface to define recesses or trenches on the substrate surface between the pillars. This type of BPM disk is shown in the sectional view in FIG. 3. In this type of BPM the disk substrate 11 with a pre-etched pattern of pillars 131 and trenches or spaces between the pillars can be produced with relatively low-cost, high volume processes such as lithography and nanoimprinting. The magnetic recording layer material is then deposited over the entire surface of the pre-etched substrate to cover both the ends of the pillars 131 and the spaces between the pillars 131, resulting in the data islands 130 of magnetic recording layer material and spaces 132 of magnetic recording layer material. In this type of BPM, the spaces 132 are also formed of recording layer material but are spaced far enough from the read head 35 and transducer 51 (FIG. 1) to not adversely affect reading or writing to the recording layer material in islands 130 and are thus nonmagnetic. The recording layer material in the spaces 132 may also be "poisoned" with a dopant material, for example silicon, so that the recording layer material in the spaces 132 is rendered nonmagnetic. The disk may then be "planarized", as illustrated by dashed line 133, by covering the disk with planarizing material that fills the spaces 132. However, in this invention the BPM may be like that shown in FIG. 3, but the spaces 132 between islands 130 are formed of a non-metallic material. This may be accomplished by filling the spaces with non-metallic material and then polishing the disk to remove any non-metallic material on the islands 130. The BPM of this invention may also be fabricated by lithographically patterning and then etching a continuous layer of magnetic material to leave data islands of magnetic material and surrounding trench regions, followed by backfilling the trench regions with a non-metallic material and then polishing to remove excess non-metallic material.

Figure 3:
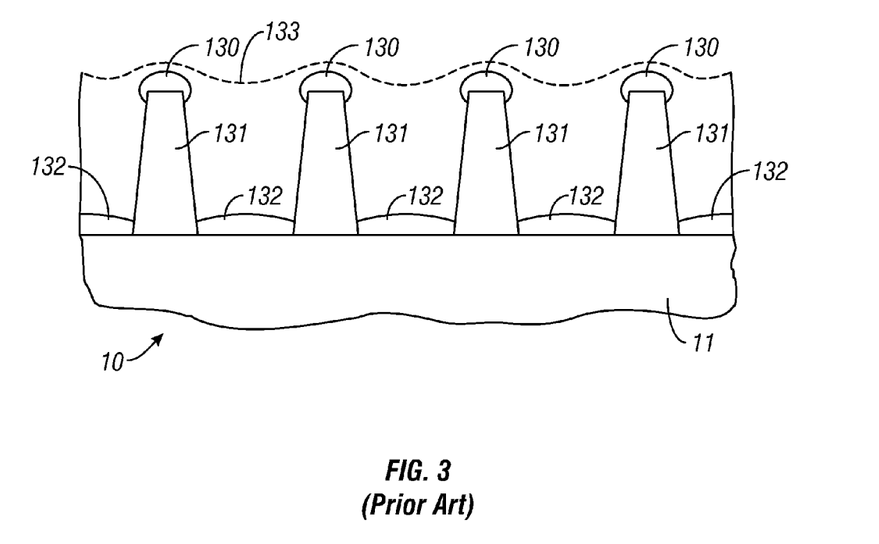
FIG. 3 is a sectional view of a prior art BPM disk wherein the data islands are elevated, spaced-apart pillars that extend above the disk substrate surface to define recesses or trenches on the substrate surface between the pillars.

For perpendicular recording, the magnetic material in the data islands 130 may be any well-known media with perpendicular magnetic anisotropy, such as a multilayer of alternating metal films, like a Co/Pt, Co/Pd, Fe/Pt, Fe/Pd or Co/Ni multilayer. In addition to a multilayer, the magnetic material may be formed of any of the known amorphous or crystalline materials and structures that exhibit perpendicular magnetic anisotropy. Thus, a granular polycrystalline cobalt alloy, such as a CoPt or CoPtCr metal alloy, with or without an oxide, such as oxides of Si, Ta, Ti, Nb, Cr, V and B, may be used. In addition, magnetic metal alloys containing rare earth elements are useable, such as CoSm, TbFe, TbFeCo, GdFe alloys. The magnetic material in the data islands may also be formed of chemically ordered CoPt, CoPd, FePt or FePd. These chemically ordered alloys, in their bulk form, are known as face-centered tetragonal (FCT) $L1_0$-ordered phase materials (also called CuAu materials). The c-axis of the $L1_0$ phase is the easy axis of magnetization and is oriented perpendicular to the substrate. Like the Co/Pt and Co/Pd multilayers, these layers exhibit very strong perpendicular magnetic anisotropy.

Figure 4:
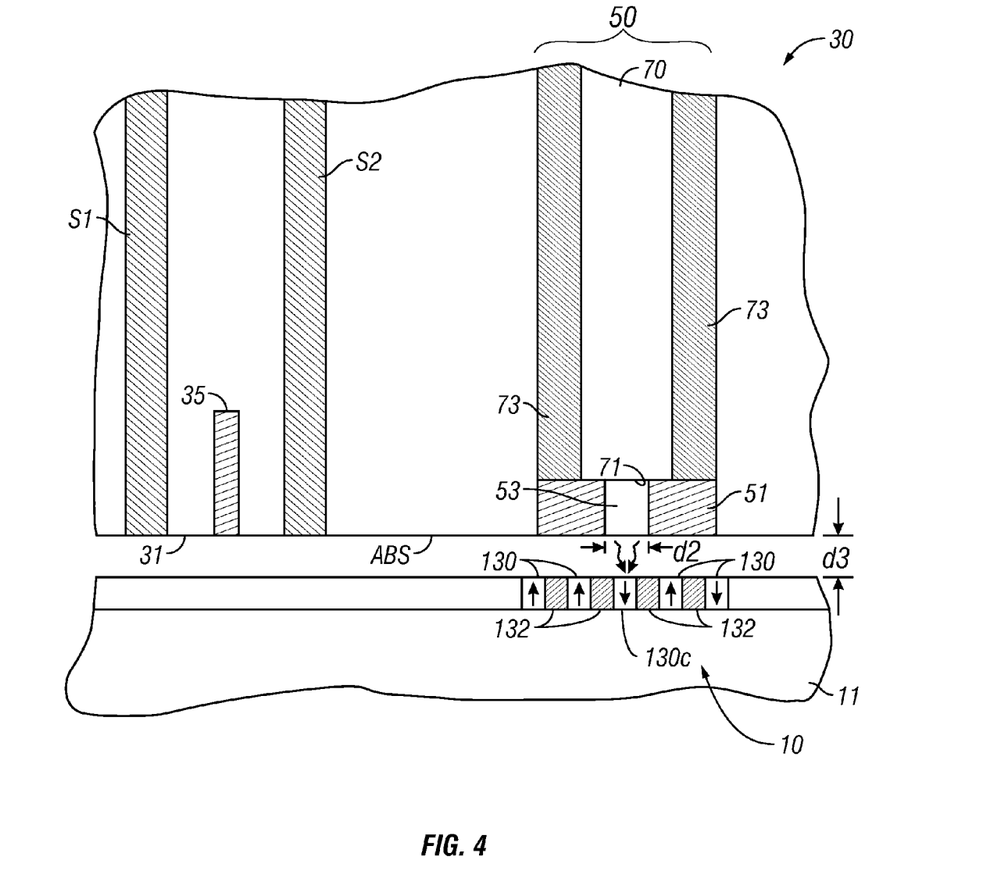
FIG. 4 is an enlarged view of a portion of the disk and carrier with supported read head and near-field transducer according to an embodiment the invention.

FIG. 4 is an enlarged view of a portion of disk 10 and carrier 30 showing the read head 35, the near-field transducer 51 and the optical channel 50. The disk 10 is shown with a data track having a series of representative magnetized metal or metal alloy data islands 130 separated by nonmagnetic non-metallic spaces 132 on the disk substrate 11. The carrier 30 may be a slider, like that used in conventional magnetic recording disk drives, that has a generally planar ABS 31 facing the disk 10. The carrier 30 is maintained a spacing distance (d3) from the surface of disk 10 by the ABS 31. The read head 35, which may be a conventional tunneling magnetoresistive (TMR) read head, has its sensing edge substantially at the ABS and is located between two magnetic shields S1, S2. In this embodiment the optical channel 50 is a thin film waveguide 70 that directs circularly polarized light to the transducer 51. The waveguide 70 is formed of a core material such as $Ta_2O_5$, $TiO_2$ or SiN that is transmissive to light at the wavelength of the laser and is surrounded by a dielectric cladding layer 73 (for example $SiO_2$ or $Al_2O_3$) of lower refractive index than the core material. The laser may a CD-RW type laser diode, with a wavelength of approximately 780 nm, and located on the actuator 40, as depicted in FIG. 1. Alternatively, the laser diode may be located on the carrier 30. In one example, the waveguide 70 may be approximately 250 nm in diameter or cross-sectional dimension with a 500 nm thick cladding layer 73 surrounding it. The waveguide 70 has an exit face 71 in contact with the transducer 51. The transducer 51 is a metal (which may include a metal alloy) with an active region 53. The metal transducer 51 may be in the form a film on the end of waveguide 70. Circularly polarized light travels through waveguide 70 to exit face 71 and to active region 53. The active region 53 of transducer 51 generates a rotating electric field in the near-field that interacts with the data island 130c, as depicted by the wavy arrows. The active region 53 has an in-plane (parallel to the ABS 31) characteristic dimension (d2), which is preferably greater than the characteristic dimension d1 of the individual data islands, like island 130c.

Figure 5A:
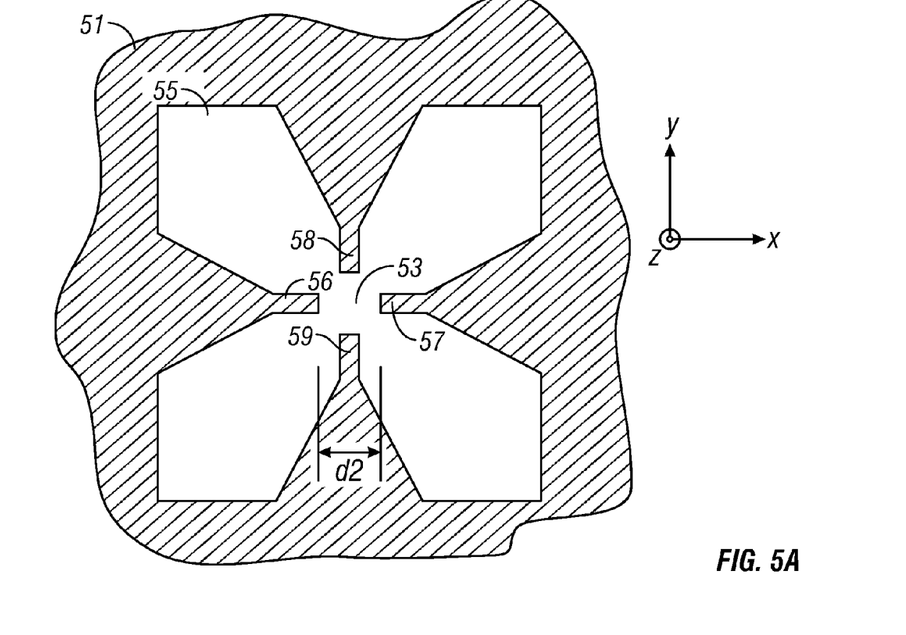
FIG. 5A is a view from the disk showing the near-field transducer as an aperture-type transducer according to an embodiment of the invention.

FIG. 5A is a view from the disk 10 showing the transducer 51 as an aperture-type transducer with active region 53. The film for transducer 51 is preferably a metallic material such as gold, silver, aluminum, copper, alloys thereof, or another suitable metallic alloy. In the embodiment of FIG. 5A the transducer 51 is an aperture-type transducer because there is an opening or aperture 55 in the film 51. The active region 53 of transducer 51 is the central portion of a larger generally "star-shaped" aperture 55 and is defined by two pairs of orthogonal tips, as shown by a first pair of tips 56, 57 and a second pair of tips 58, 59. The pairs of tips are orthogonal, meaning that a line in the plane of the film connecting tips 56 and 57 is orthogonal to a line in the plane of the film connecting tips 58 and 59. Each pair of opposing tips is designed to produce an intense near-field pattern for each of two orthogonal polarization directions. The aperture 55 and the shape of the tips may be formed by etching the film by a focused ion beam (FIB) or by e-beam lithography. The area of the film that is removed to form the aperture 55 may be backfilled by a dielectric material transmissive to light at the wavelength of the laser to ensure planarity of the surface facing the disk 10.

The transducer 51 with active region 53 is a "near-field" transducer, which as used herein refers to "near-field optics" wherein the passage of light is through an element with subwavelength features and the light is coupled to a second element located a subwavelength distance from the first. The near-field transducer 51 has an active region 53 with a characteristic dimension d2 less than the wavelength of the light, and the spacing d3 between the active region 53 and the islands on disk 10, like island 130c in FIG. 4, is also less that the wavelength of the light.

In this invention it has been discovered through simulation that the near-field transducer 51 shown in FIG. 5A is incapable of magnetizing domains in a continuous layer of magnetic material. In the simulation the star-shaped aperture 55 with central active region 53 between the tips 56-59 was $SiO_2$ and the incident light approximated a plane wave with polarization from left to right (assume this is the x axis) in FIG. 5. The transducer 51 was a 98 nm thick gold film. Each of the four tips 56-59 had an in-plane width of 16 nm and opposing tips were spaced apart 32 nm. The characteristic dimension d2 of the central active region 53 (the tip to tip dimension) was adjusted to resonate with the incident light, in this example at a wavelength of 830 nm. The active region was located a spacing distance d3 of 8 nm from a layer of continuous magnetic material of Co. The simulation showed that the electric field lines were approximately normal to the disk plane at the surface of the disk. In particular, the out-of-plane electric field $E_z$ (perpendicular to the disk plane) had a peak intensity approximately 8 times the peak intensity of the in-plane electric field $E_x$. This is undesirable since it is the in-plane electric field that is required to induce the magnetization in the magnetic material according to the IFE.

However, when the layer of continuous magnetic material was replaced with BPM with islands having a lateral or in-plane characteristic dimension d1 less than the characteristic in-plane dimension d2 of active region 53, surprisingly different results were obtained in the simulation. A single circularly-shaped cobalt (Co) island with a diameter and characteristic dimension d1 of 16 nm was located a spacing distance d3 of approximately 8 nm below active region 53. The Co magnetic island was 20 nm high on a 30 nm thick underlayer and was surrounded by material with a dielectric constant of 1 (such as air). The incident light approximated a plane wave with polarization from left to right in FIG. 5A. The out-of-plane electric field $E_z$ (perpendicular to the disk plane) had a peak intensity only about 60% the peak intensity of the in-plane electric field $E_x$. The horizontal or in-plane electric field component is now significantly larger than the vertical or out-of-plane electric field component. More importantly, the peak intensity of the in-plane electric field was about 45 times the peak intensity of the in-plane electric field for the simulation with the continuous magnetic layer. Additionally, it was shown that the power absorption was confined to the Co island. The in-plane electric field was especially strong at the top perimeter of the Co island on the right and left sides in FIG. 5A (near tips 56, 57). By symmetry, if the incident light were polarized longitudinally from top to bottom in FIG. 5, the tips 58, 59 would produce a very strong in-plane electric field $E_y$ at the top and bottom edges of the island. For circularly polarized incident light, the two orthogonal polarizations will be 90 degrees out of phase and the resulting near-field pattern of electric field will be the sum of two orthogonal patterns, $E_x$ and $E_y$, also 90 degrees out of phase. This means that the islands will experience a strong rotating in-plane electric field, which is ideal for the IFE.

Figure 6:
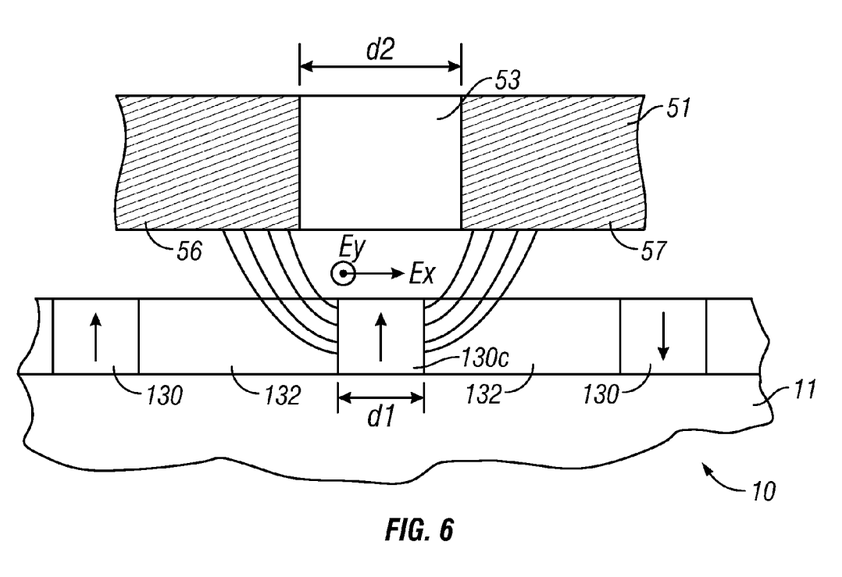
FIG. 6 is a schematic representation of the electric field lines from the transducer to an individual magnetized island in the system according to the invention.

Thus, in this invention it has been unexpectedly discovered through near-field optical modeling of the transducer 51 with the active region 53 defined by the four tips 56-59 that circularly polarized light will produce an intense near-field power that couples to a discrete magnetic island. This is depicted in FIG. 6, which is a schematic representation of the electric field lines from the transducer 51 to an individual magnetized island 130c surrounded by non-metallic spaces 132. At the surface of the island 130c there are very strong electric field components $E_x$ and $E_y$ in the plane of the disk. The patterning of the disk into discrete islands with characteristic dimension d1 results in a focusing of the electric field lines toward the island 130c beneath the active region 53, especially toward the edges of the island. Preferably, the islands have a characteristic dimension d1 less than the characteristic dimension d2 of the active region 53, as depicted in FIG. 6. However, d1 may be larger than d2, for example up to about 1.5 times d2. This focusing of the electric field lines means that the electric field lines have a strong component in the plane of the disk along the sides of the island, which enables all-optical switching of the magnetization of the island 130c by the IFE.

Figure 5B:
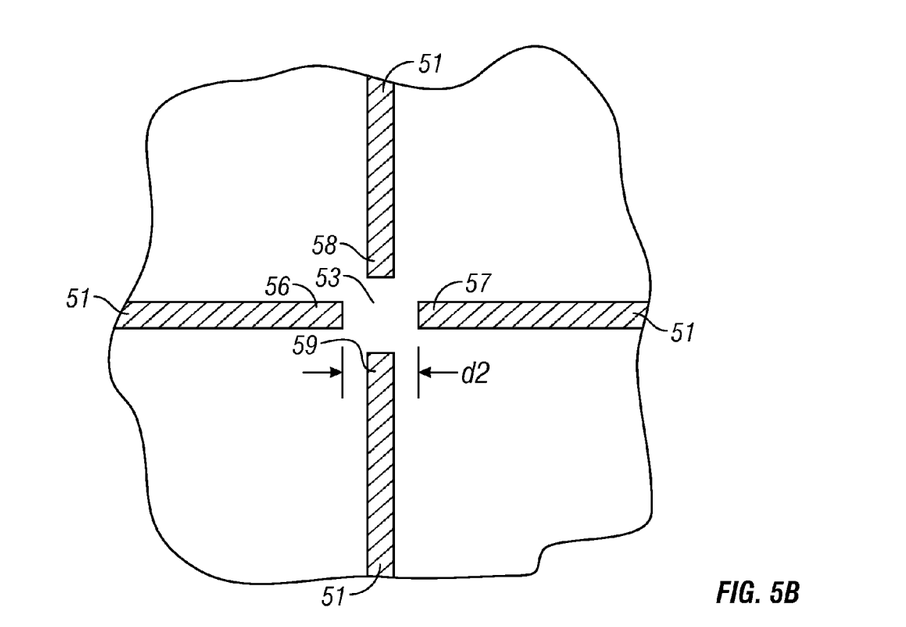
FIG. 5B is a view from the disk showing the near-field transducer as an antenna-type transducer according to an embodiment of the invention.

FIG. 5B shows an embodiment of the near-field transducer as an antenna-type transducer. The film 51 does not have an aperture but is patterned as four orthogonal lines with tips 56-59. Like the embodiment of FIG. 5A the tips 56-59 define the central active region 53 with characteristic dimension d2.

In both embodiments of the transducers (FIGS. 5A and 5B), there are four tips 56-59 that surround and define active region 53. However, the transducer will also operate with at least 3 tips that surround and define the active region. For example, three tips arranged approximately 120 degrees apart would generate an electric field with components $E_x$ and $E_y$ in the plane of the disk.

Figure 7A:
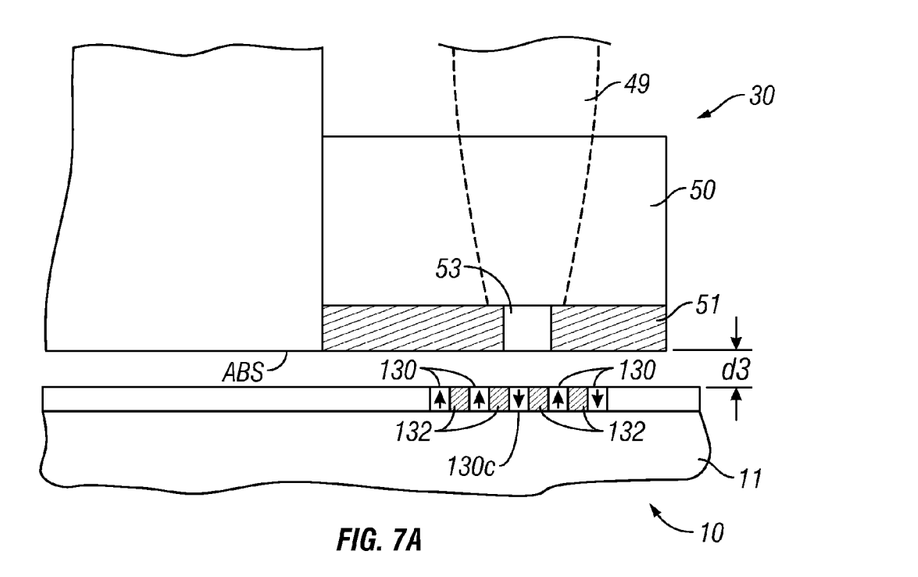
FIG. 7A is a view of an embodiment of the carrier wherein the optical channel is located within an opening in the body of the carrier.
Figure 7B:
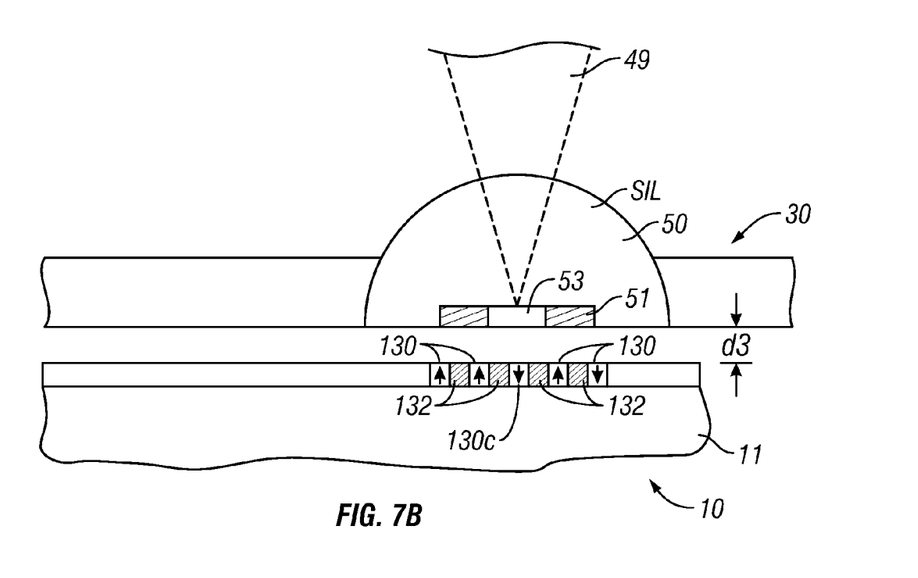
FIG. 7B is a view of an embodiment of the carrier wherein the optical channel is a solid immersion lens (SIL) on the carrier.

In FIG. 4, the optical channel 50 is a waveguide on carrier 30. However, as shown in FIG. 7A, the optical channel 50 may also be a light-transmissive portion of carrier 30 that receives the circularly polarized light beam 49. The optical channel 50 may also be located within an opening in the body of the carrier 30, as shown in FIG. 7B which also depicts an embodiment in which the optical channel 50 is a solid immersion lens (SIL) on the carrier 30. Air-bearing sliders with hemispherical and super-hemispherical SILs for optical data recording are described in U.S. Pat. No. 5,497,359 and U.S. Pat. No. 6,055,220. Numerous other techniques and structures for attachment of the optical channel to an air-bearing slider or carrier are possible.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording system comprising:
   a patterned magnetic recording medium comprising a generally planar substrate and a plurality of discrete spaced-apart magnetic islands separated by nonmagnetic spaces, each island comprising magnetizable material, the islands being formed of a metal or metal alloy and the spaces being formed of a non-metallic material;
   a laser for generating light;
   a polarizer for circularly polarizing the laser light;
   a near-field transducer for directing the circularly polarized light to individual islands on the substrate, the near-field transducer comprising a metal and having an active region;
   a carrier connected to the transducer for moving the transducer to individual islands, the carrier being maintained with the transducer active region less than the laser light wavelength from the individual islands; and
   wherein the islands have a characteristic lateral in-plane dimension generally parallel to the substrate and the active region has a lateral in-plane dimension that is less than the wavelength of the laser light.

2. The system of claim 1 further comprising an optical channel for directing the circularly polarized light to the transducer.

3. The system of claim 2 wherein the optical channel comprises a waveguide on the carrier and having a substantially planar surface facing the medium substrate, and wherein the metal of the transducer is formed on said substantially planar waveguide surface.

4. The system of claim 2 wherein the optical channel is a portion of the carrier transmissive to the laser light, said carrier portion having a substantially planar surface facing the medium substrate, and wherein the metal of the transducer is formed on said substantially planar surface of said carrier portion.

5. The system of claim 2 wherein the optical channel comprises a solid immersion lens (SIL) on the carrier.

6. The system of claim 1 wherein the characteristic dimension of the islands is less than or equal to 1.5 times the lateral in-plane dimension of the active region.

7. The system of claim 6 wherein the characteristic dimension of the islands is less than the lateral in-plane dimension of the active region.

8. The system of claim 1 wherein the metal of the transducer is a metallic film formed of a material selected from Au, Ag, Al, Cu and alloys thereof.

9. The system of claim 1 wherein the metal of the transducer includes at least three spaced-apart tips, and wherein the active region is located between the tips.

10. The system of claim 1 wherein the metal of the transducer includes two pairs of spaced-apart tips, the pairs being oriented substantially orthogonal to one another, and wherein the active region is located between the tips.

11. The system of claim 1 wherein the medium is a rotatable disk and the magnetic islands are arranged in a pattern of concentric circular tracks on the substrate, and further comprising a spindle motor for rotating the disk.

12. The system of claim 11 wherein the carrier has an air-bearing surface (ABS) facing the disk, and wherein the transducer is located on the ABS of the carrier.

13. The system of claim 12 further comprising an actuator connected to the carrier for moving the carrier to selected tracks of the disk.

14. A system for magnetizing a discrete magnetic island comprising:
   a substrate;
   a discrete island of magnetizable metallic or metallic alloy material on the substrate and surrounded by non-metallic non-magnetizable material, the island having magnetic anisotropy substantially perpendicular to the substrate and a characteristic dimension d1 parallel to the substrate;
   a near-field metal transducer having an active region having a characteristic dimension d2 parallel to the substrate, wherein d1 is less than or equal to 1.5 times d2, the transducer active region being located parallel to said substrate at a distance d3 from said island, wherein the transducer contains at least three spaced-apart tips, the active region being located between the tips; and means for directing circularly polarized light to the transducer for near-field coupling to said island, the light having a wavelength greater than d2 and greater than d3.

15. The system of claim 14 wherein d1 is less than d2.

16. The system of claim 14 wherein the metal transducer is patterned into two pairs of spaced-apart tips, the pairs being oriented substantially orthogonal to one another, and wherein the active region is located between the tips.

17. The system of claim 14 wherein the metal tips are formed of a material selected from Au, Ag, Al, Cu and alloys thereof.

\* \* \* \* \*

UNITED STATES PATENT AND TRADEMARK OFFICE
CERTIFICATE OF CORRECTION

| | | |
|---|---|---|
| PATENT NO. | : 8,164,988 B2 | Page 1 of 1 |
| APPLICATION NO. | : 12/707402 | |
| DATED | : April 24, 2012 | |
| INVENTOR(S) | : Barry Cushing Stipe | |

It is certified that error appears in the above-identified patent and that said Letters Patent is hereby corrected as shown below:

On the Title page, "Assignee", delete the misspelled term "Globa" and replace with the word --Global--.

Signed and Sealed this
Thirty-first Day of July, 2012

David J. Kappos
*Director of the United States Patent and Trademark Office*